(12) United States Patent
Li et al.

(10) Patent No.: US 9,594,273 B2
(45) Date of Patent: Mar. 14, 2017

(54) ILLUMINATION DEVICE, DEDICATED GLASSES, ANALYZER AND ILLUMINATION SYSTEM

(71) Applicant: BOE Technology Group Co., Ltd., Beijing (CN)

(72) Inventors: Wenbo Li, Beijing (CN); Yanbing Wu, Beijing (CN); Yefei Dong, Beijing (CN); Chunyan Ji, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 6 days.

(21) Appl. No.: 14/652,220

(22) PCT Filed: Sep. 20, 2014

(86) PCT No.: PCT/CN2014/087008
§ 371 (c)(1),
(2) Date: Jun. 15, 2015

(87) PCT Pub. No.: WO2015/192508
PCT Pub. Date: Dec. 23, 2015

(65) Prior Publication Data
US 2015/0370128 A1    Dec. 24, 2015

(30) Foreign Application Priority Data
Jun. 19, 2014  (CN) .......................... 2014 1 0277670

(51) Int. Cl.
*G02F 1/1335*  (2006.01)
*G02F 1/1333*  (2006.01)
(Continued)

(52) U.S. Cl.
CPC ....... *G02F 1/133528* (2013.01); *G02B 27/28* (2013.01); *G02F 1/13363* (2013.01);
(Continued)

(58) Field of Classification Search
CPC ................ G02F 1/1335; G02F 1/1333; G02F 1/133528; G02F 1/133308; G02F 1/133512;
(Continued)

(56) References Cited

U.S. PATENT DOCUMENTS

2007/0242352 A1    10/2007    MacMaster

FOREIGN PATENT DOCUMENTS

CN        201477327 U      5/2010
CN        103064211 A      4/2013
(Continued)

OTHER PUBLICATIONS

Feb. 27, 2015—International Search Report and Written Opinion for Appn PCT/CN2014/087008 with Eng Tran.
(Continued)

*Primary Examiner* — Thoi Duong
(74) *Attorney, Agent, or Firm* — Banner & Witcoff, Ltd.

(57) ABSTRACT

An illumination device, dedicated glasses thereof, an analyzer thereof and an illumination system are provided. The illumination device includes a support member and a liquid crystal display panel mounted on the support member. The liquid crystal display panel includes a display area and a light emitting area, the liquid crystal display panel is provided with a first polarization sheet at its light incoming side in areas corresponding to the display area and the light emitting area, and is provided with a second polarization sheet at its light outgoing side only in area corresponding to the display area. The illumination device emits white light and can be used as an ordinary lamp because its light emitting area cannot be observed in the naked eye state, and when observed through the dedicated glasses or the analyzer, the content of the secret information displayed by the liquid crystal display panel can be seen.

15 Claims, 5 Drawing Sheets

(51) Int. Cl.
  *G02F 1/13363* (2006.01)
  *G02B 27/28* (2006.01)
  *G02B 5/30* (2006.01)

(52) U.S. Cl.
  CPC .. *G02F 1/133308* (2013.01); *G02F 1/133512* (2013.01); *G02F 1/133514* (2013.01); *G02F 1/133555* (2013.01); *G02B 5/3083* (2013.01); *G02F 2001/133531* (2013.01); *G02F 2001/133638* (2013.01)

(58) Field of Classification Search
  CPC ......... G02F 1/133536; G02F 1/133526; G02F 1/1339; G02F 1/133615; G02F 1/136209; G02F 1/133514; G02F 1/133555; G02F 2001/133388; G02F 2001/133317; G02F 2001/133331; G02F 2001/133531; G02F 2001/133548; G02F 2001/133638; G02B 5/3025; G02B 27/26; G02B 27/0955; H01L 27/3211; H01L 27/322; H01L 51/524

USPC ... 349/58, 96, 110, 106, 12, 153, 1, 11, 190, 349/117, 56, 95, 13, 57, 65, 114
  See application file for complete search history.

(56) References Cited

FOREIGN PATENT DOCUMENTS

| | | |
|---|---|---|
| CN | 103235441 A | 8/2013 |
| CN | 103676295 A | 3/2014 |
| WO | 2006030512 A1 | 3/2006 |

OTHER PUBLICATIONS

May 16, 2016—(CN)—First Office Action Appn 201410277670.8 with English Tran.
Sep. 18, 2016—(CN)—Second Office Action Appn 201410277670.8 with English Tran.

ILLUMINATION DEVICE, DEDICATED GLASSES, ANALYZER AND ILLUMINATION SYSTEM

The application is a U.S. National Phase Entry of International Application No. PCT/CN2014/087008 filed on Sep. 20, 2014, designating the United States of America and claiming priority to Chinese Patent Application No. 201410277670.8 filed on Jun. 19, 2014. The present application claims priority to and the benefit of the above-identified applications and the above-identified applications are incorporated by reference herein in their entirety.

TECHNICAL FIELD

At least one embodiment of the present invention relates to an illumination device, dedicated glasses thereof, an analyzer thereof and an illumination system.

BACKGROUND

Illumination devices, as daily consuming products, have undergone great change with the development of the economic society and the emergence of new light sources such as fluorescent lamp, energy saving lamp, LED lamp, and so on. The variety and the multiple choices of the light sources also make the illumination lamp industry advance to a new level. It is necessary to decorate the places such as city plazas, traffic roads, newly built communities, house decoration, super markets, office buildings, and so on by use of the illumination products, and therefore, new requirements occur for the illumination products.

SUMMARY

At least one embodiment of the present invention provides an illumination device, dedicated glasses thereof, an analyzer thereof and an illumination system, by which a light emitting area of a liquid crystal display panel can be used as an illumination lamp as information contained therein can not be observed in naked eye state, but the secret information content shown by the liquid crystal display panel can be observed when observed through the dedicated glasses or the analyzer.

At least one embodiment of the present invention provides an illumination device comprising a support member and a liquid crystal display penal mounted on the support member. The liquid crystal display comprises a display area and a light emitting area, the liquid crystal display panel is provided with a first polarization sheet at its light incoming side in areas corresponding to the display area and the light emitting area, and is provided with a second polarization sheet at its light outgoing side only in an area corresponding to the display area.

At least one embodiment of the present invention provides a dedicated glasses for the above illumination device provided by an embodiment of the present invention comprising lenses each having a second polarization sheet.

At least one embodiment of the present invention provides an analyzer for the above illumination device provided by an embodiment of the present invention including a second polarization sheet.

At least one embodiment of the present invention also provides an illumination system comprising the above illumination device provided by an embodiment of the present invention and the above dedicated glasses provided by an embodiment of the present invention; or comprising the above illumination device provided by an embodiment of the present invention and the analyzer provided by an embodiment of the present invention, wherein the analyzer is provided at a distance from the illumination device.

DESCRIPTION OF THE ACCOMPANYING DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
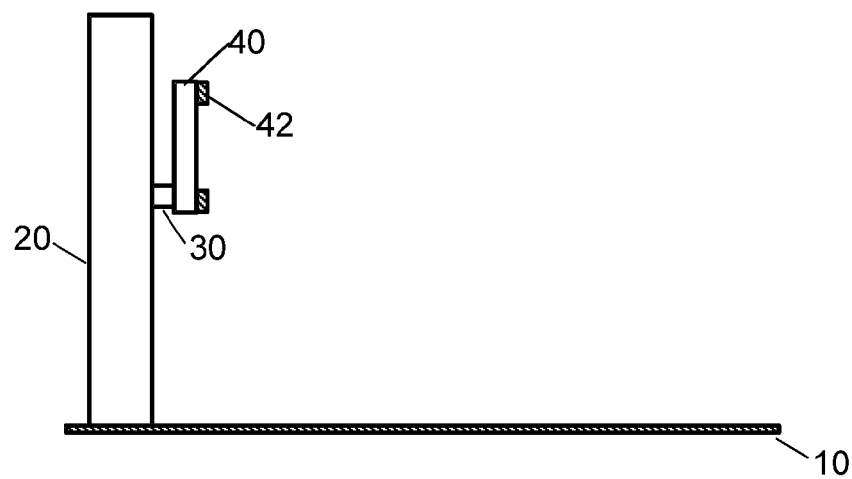
FIG. 1 is a schematic diagram showing the structure of an illumination device provided by an embodiment of the present invention.
Figure 2A:
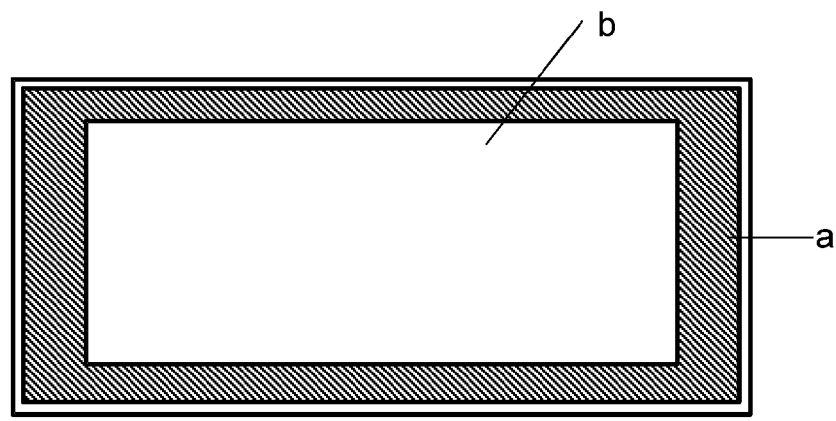
FIG. 2a to FIG. 2d are schematic diagrams showing the light emitting area and the display area of an illumination device provided by an embodiment of the present invention.
Figure 2B:
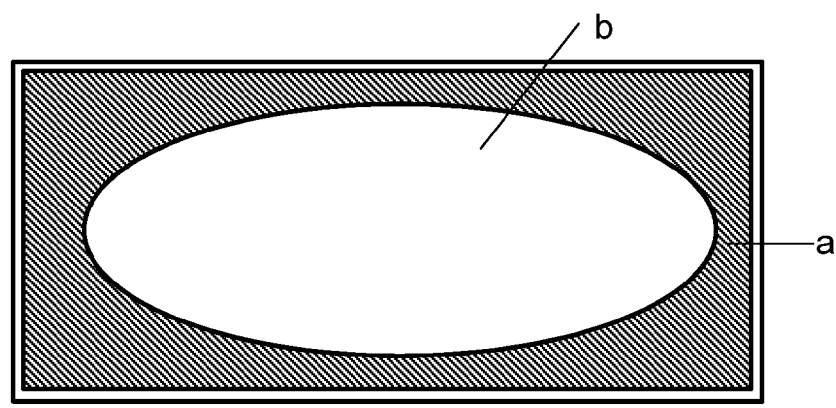
Figure 2C:
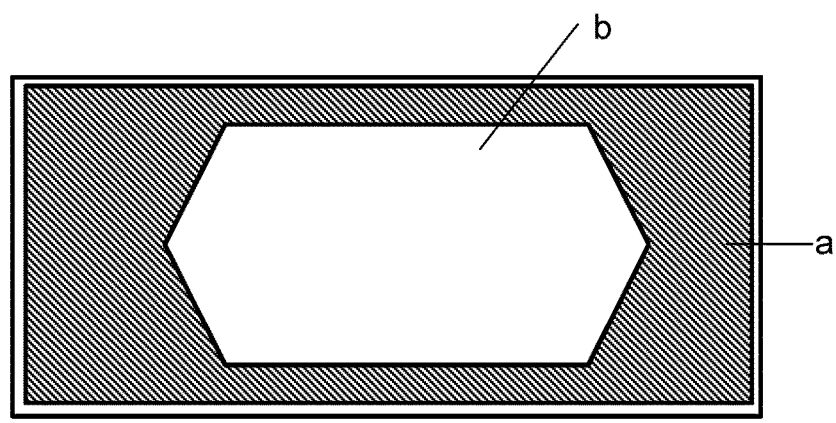
Figure 2D:
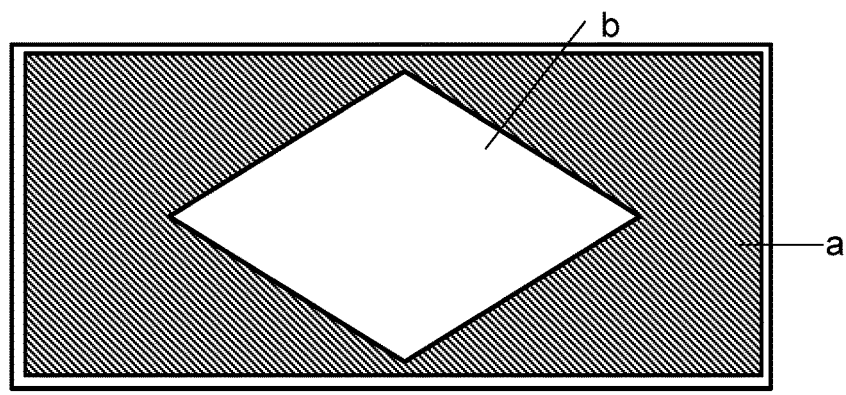

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventors of the present invention have noted that the present illumination products only have the ordinary illumination function but do not include other special display function.

At least one embodiment of the present invention provides an illumination device, the illumination device includes a support member and a liquid crystal display panel mounted on the support member; the liquid crystal display panel includes a display area and a light emitting area, and at a light incoming side, the liquid crystal display panel has a first polarization sheet in areas corresponding to the display area and the light emitting area, and at a light outgoing side, the liquid crystal display panel has a second polarization sheet in an area corresponding to only the display area.

In one embodiment, the area of the liquid crystal display panel at the light outgoing side corresponding to the light emitting area may be further provided with a quarter-wave plate, and the quarter-wave plate has a fast axis which forms a predetermined angle with the polarization axis of the first polarization sheet, and the predetermined angle is larger than or equal to 0 degree and less than or equal to 90 degrees, for example, the predetermined angle can be 45 degrees.

The liquid crystal display panel includes an array substrate and a counter substrate arranged opposite to each other, and a liquid crystal layer provided between the counter substrate and the array substrate. In a different embodiment, the side of the counter substrate facing the array substrate or the side of the array substrate facing the counter substrate may be provided with a black matrix layer and a color filter layer; alternatively, the side of the counter substrate facing the array substrate or the side of the array substrate facing the counter substrate may be provided with the black matrix layer only.

In one embodiment, the above illumination device may further include a transflective layer provided on a transparent substrate at the side of the counter substrate facing away from the array substrate.

At least one embodiment of the present invention further provides a dedicated glasses for the above-described illumination device, the dedicated glasses includes lenses each including a second polarization sheet. In one embodiment, the lenses each may further include a quarter-wave plate, and the quarter-wave plate and the second polarization sheet are sequentially arranged in a direction pointing to the light outgoing side from the light incoming side of the lenses, and the quarter-wave plate has a fast axis forming an angle, equal to the predetermined angle, with the polarization axis of the second polarization sheet, or the fast axis of the quarter-wave plate forming an angle with the polarization axis of the second polarization sheet, and the sum of the angle and the predetermined angle is 90 degrees.

At least one embodiment of the present invention further provides an analyzer for the above-described illumination device, the analyzer includes a second polorization sheet. In one embodiment, the above analyzer may further include a quarter-wave plate, the quarter-wave plate and the second polorization sheet are sequentially arranged in a direction pointing to the light outgoing side from the light incoming side, and the fast axis of the quarter-wave plate forms an angle, equal to the predetermined angle, with the polorization axis of the second polorization sheet, or the fast axis of the quarter-wave plate forms an angle with the polorization axis of the polorization sheet, and the sum of the angle and the predetermined angle is 90 degrees.

At least one embodiment of the present invention further provides an illumination system, the illumination system includes any above-described illumination device and any above described dedicated glasses, or the illumination system may include any above described illumination device and any above described analyzer; the analyzer is provided at a distance from the illumination device. In one embodiment, when the liquid crystal display panel has the quarter-wave plate at the light outgoing side in the area corresponding to the light emitting area, the dedicated glasses include the lenses having the quarter-wave plates or the analyzer includes the quarter-wave plate.

Hereinafter, the particular embodiments of the illumination device, the dedicated glasses thereof, the analyzer thereof and the illumination system provided by the embodiments of the present invention will be further described in detail with reference to the accompanying drawings.

The shape and size of the areas in the attached drawings does not represent the true scale of the illumination device, and it is only used to schematically described the content of the present invention.

First Embodiment

As shown in FIG. 1, the illumination device provided by the first embodiment includes a support member 30 and a liquid crystal display panel 40 mounted on the support member 30. As shown in FIG. 2a to FIG. 2d, the liquid crystal display panel 40 is divided into a display area "a" and a light emitting area "b."

Figure 3:
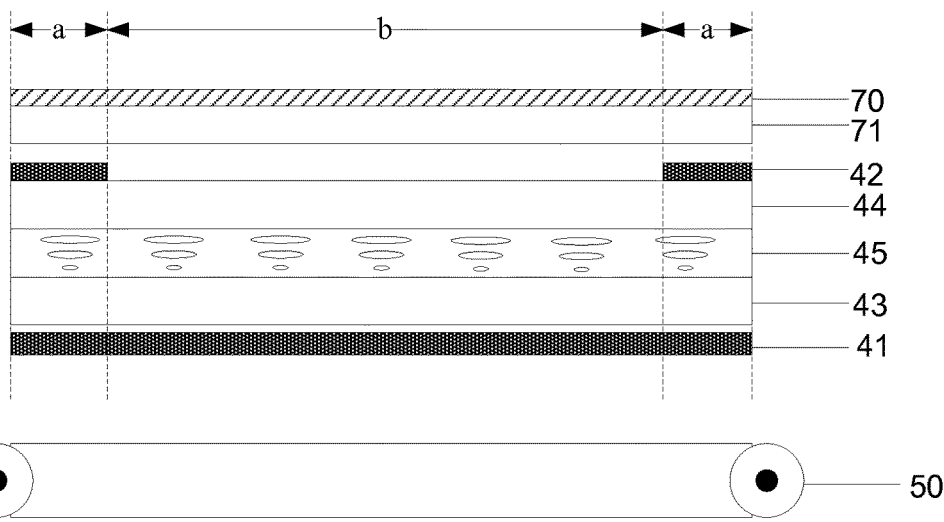
FIG. 3 is a schematic diagram showing the structure of the liquid crystal display panel included in an illumination device provided by a first embodiment of the present invention.

As shown in FIG. 3, at its light incoming side, the liquid crystal display panel 40 in its areas corresponding to the display area a and the light emitting area b is provided with a first polarization sheet 41, that is, at the side where there is provided a backlight module 50 from which light is emitted, the first polarization sheet 41 is provided. At its light outgoing side, the liquid crystal display panel 40 is provided with a second polarization sheet 42 only in an area corresponding to the display area a.

In the present embodiment, the illumination device is described by taking a wall lamp as an example. In practice, as shown in FIG. 1, the liquid crystal display panel 40 can be fixed on a wall surface 20 perpendicular to the ground 10 by using the support member 30 included in the illumination device. Of course, the illumination device provided by the present embodiment may also be used as a ceiling lamp, or other illumination lamp, there is no limitation herein.

Hereinafter, the principle of the above illumination device provided by the first embodiment will be described.

The display area "a" in the illumination device provided by the first embodiment of the present invention can display normal images, for decorate the outer appearance of the illumination device. In practice, the content displayed by the display area "a" may be suitably designed according to user's requirements, for example, the content to be displayed may be in a stationary pattern, such as, strips, scenes, pictures, and so on, or may be in a dynamic pattern, such as a flying dragon, a swimming golden fish, and so on. Furthermore, the shape of the display area a and the light emitting area b may be designed according to the requirements upon the content to be displayed, for example, may be of various shapes as shown in FIG. 2a to FIG. 2d, and there is no limitation herein.

In order to describe the benefit effect of the light emitting area b of the illumination device, a dedicated glasses for the above illumination device provided by the first embodiment is introduced, and the dedicated glasses include lenses each having a second polarization sheet, or an analyzer for the above illumination device provided by the first embodiment of the present invention is introduced, the analyzer includes a second polarization sheet. In practice, the dedicated glasses can be carried by the user, and the analyzer generally is provided at a fixed position at a certain distance from the illumination device. Below, the dedicated glasses or the analyzer will not be separately described.

Figure 4A:
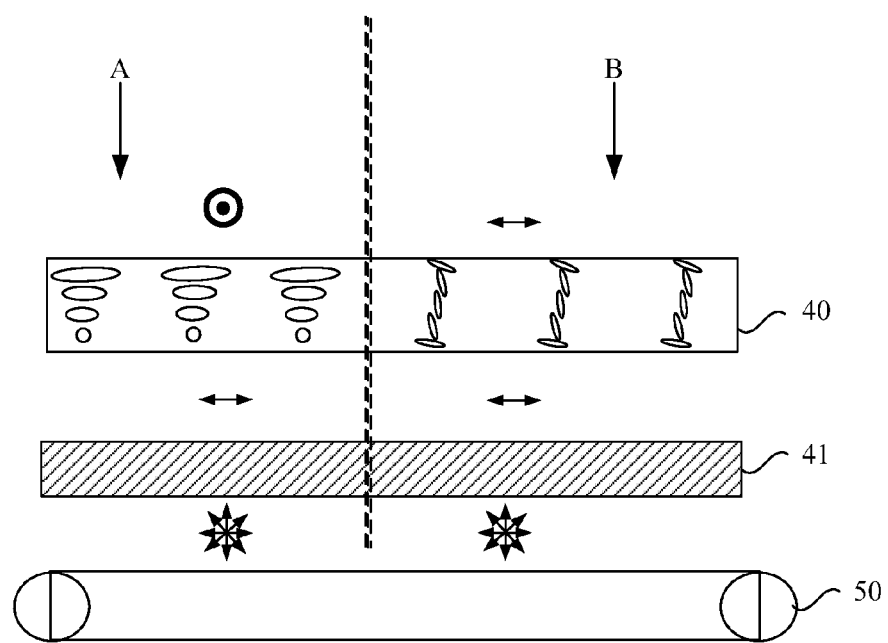
FIG. 4a to FIG. 4c are schematic diagrams showing the principle of the first embodiment of the present invention.

In the illumination device provided by the first embodiment of the present invention, as shown in FIG. 4a, the area A and the area B are respectively in a bright state and a dark state, the liquid crystal display panel only has the first polarization sheet 41 in the light emitting area b, and after passing through the first polarization sheet 41, the light is changed into line polarized light, and the line polarized light is transmitted through the liquid crystal display panel 40 and is emitted outside. Since the light is not filtered by the second polarization sheet, the information included therein can not be displayed when being observed in naked eye state, white light is emitted, and the area can be used as an ordinary lamp.

Figure 4B:
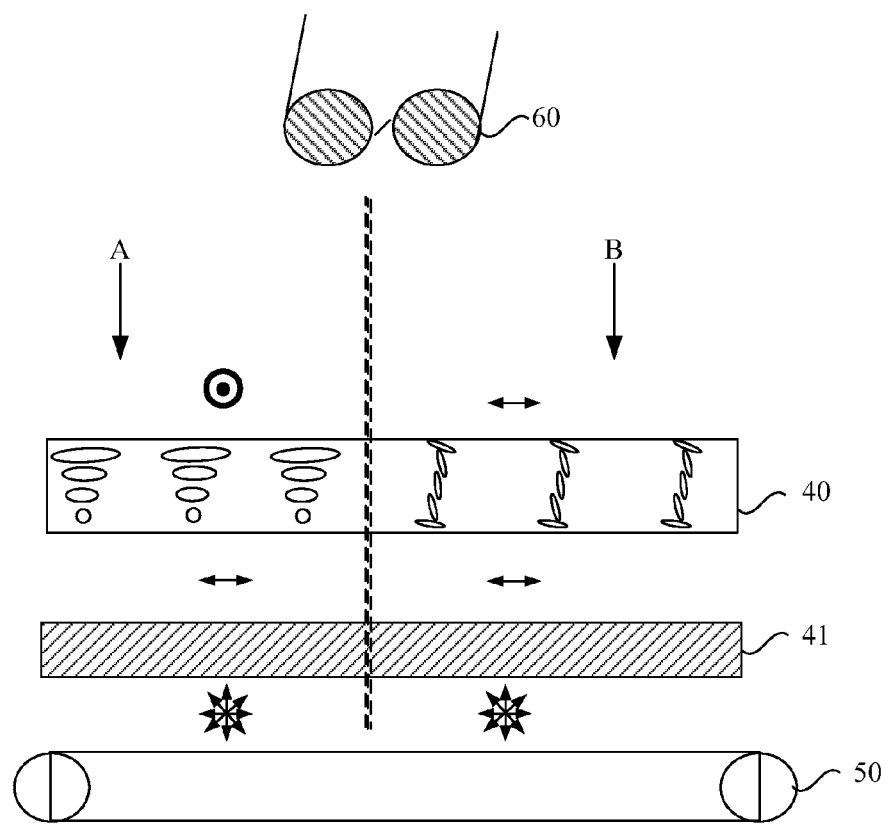
Figure 4C:
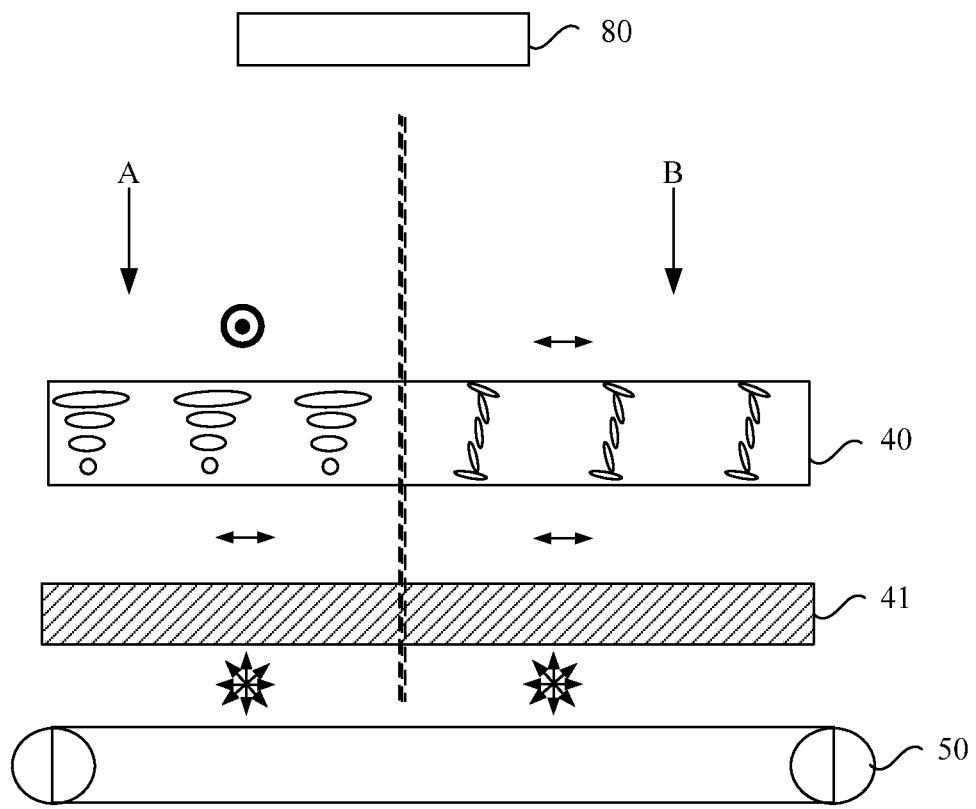

As shown in FIG. 4b and FIG. 4c, when the liquid crystal display panel 40 is observed through the dedicated glasses 60 or the analyzer 80, due to the filter function by the second polarization sheet in the dedicated glasses 60 or the analyzer 80, the content of the secret information displayed in the light emitting area b by the liquid crystal display panel 40 can be observed.

In practice, the above-described illumination device provided by the first embodiment of the present invention can be used in a meeting room or in an exhibition hall. For example, one row of the above illumination devices can be provided in the exhibition hall as wall lamps, for the ordinary visitors, the illumination device only acts to illuminate, but the staff may wear the special dedicated glasses having the second polarization sheet, or the staff may use the stationary analyzer to observe the information, such as notice, client information, and so on from the illumination device.

Since the liquid crystal display panel 40 in the above illumination device is used as an illumination lamp, there is no strictly requirements on the color gamut of the display panel. In one example, when the secret information to be displayed is not relevant to the color, that is, where the content to be displayed is only a piece of black-white picture information at a gray scale, the color filter layer in the liquid crystal display panel 40 can be omitted. Thus, the manufacturing process for the liquid crystal display panel 40 can be simplified on one hand, and on the other hand, the emitting brightness of the liquid crystal display panel 40 as an illumination lamp can be increased.

For example, as shown in FIG. 3, the liquid crystal display panel 40 may include an array substrate 43 and a counter substrate 44 provided opposite to each other, and a liquid crystal layer 45 provided between the counter substrate 44 and the array substrate 43. A black matrix layer and a color filter layer are provided at the side of the counter substrate 44 facing the array substrate 43 or at the side of the array substrate 43 facing the counter substrate 44. Alternatively, the color filter layer can be omitted, that is, only the black matrix layer is provided at the side of the counter substrate 44 facing the array substrate 43 or at the side of the array substrate 43 facing the counter substrate 44.

When not in operation, the illumination device provided by the embodiment of the present invention generally renders black color, but in order to improve the practicability and aesthetics of the illumination device, in one example, a transflective layer can be provided at the light outgoing side of the liquid crystal display panel 40 so that the illumination device can be used as a mirror by reflecting the ambient light when not in operation.

For example, the transflective layer provided on the outgoing side of the liquid crystal display panel 40 can be formed from a metalized film or a dual-reflective brightness enhancement film (DEBEF).

For example, as shown in FIG. 3, the transflective layer 70 may be provided on a transparent substrate 71 provided at a side of the counter substrate 44 facing away from the array substrate 43.

Based on the same inventive concept, the first embodiment of the present invention further provides an illumination system including the above illumination device provided by the first embodiment of the present invention and the dedicated glasses for the illumination device; or the illumination system includes the above-described illumination device provided by the first embodiment of the present invention and the analyzer for the illumination device, which is provided at a certain distance from the illumination device. The implementation of the illumination system may refer to the embodiment described with reference to the above illumination device and its dedicated glasses or analyzer, and will not be repeatedly described here.

In the above illumination device, a dedicated glasses thereof, an analyzer thereof and the illumination system provided by the embodiments of the present invention, the liquid crystal display panel is used as a lamp capable of displaying pattern and information, and the liquid crystal display panel is divided into the display area and the light emitting area, at the light incoming side, the areas corresponding to the display area and the light emitting area are both provided with the first polarization sheet, and at the light outgoing side, only the area corresponding to the display area is provided with the second polarization sheet, that is, the light emitting area is not provided with the second polarization sheet. Thus, when the liquid crystal display panel is in operation, the light from the backlight module is changed into line polarized light after passing the first polarization sheet. In the light emitting area, the line polarized light is emitted as white light after transmitting through the liquid crystal display panel because it has not been filtered by the second polarization sheet and the information contained therein cannot be seen when being observed in naked eye state, and can be used as an ordinary lamp. In the display area, the line polarized light, after transmitting through the liquid crystal display panel, is filtered by the second polarization sheet, and the information contained therein can be observed in the naked eye state, and thus the display area can display a designed pattern and simple share information, to improve the aesthetic appearance of the display device. By wearing the dedicated glasses which are provided with the lenses each having the second polarization sheet, or by the analyzer having the second polarization sheet which is provided at a distance from the illumination device, due to the light filtering function of the second polarization sheet, the content of the secret information displayed in the light emitting area by the liquid crystal display panel can be observed, and the special display function of the illumination device can be achieved.

Second Embodiment

Figure 5:
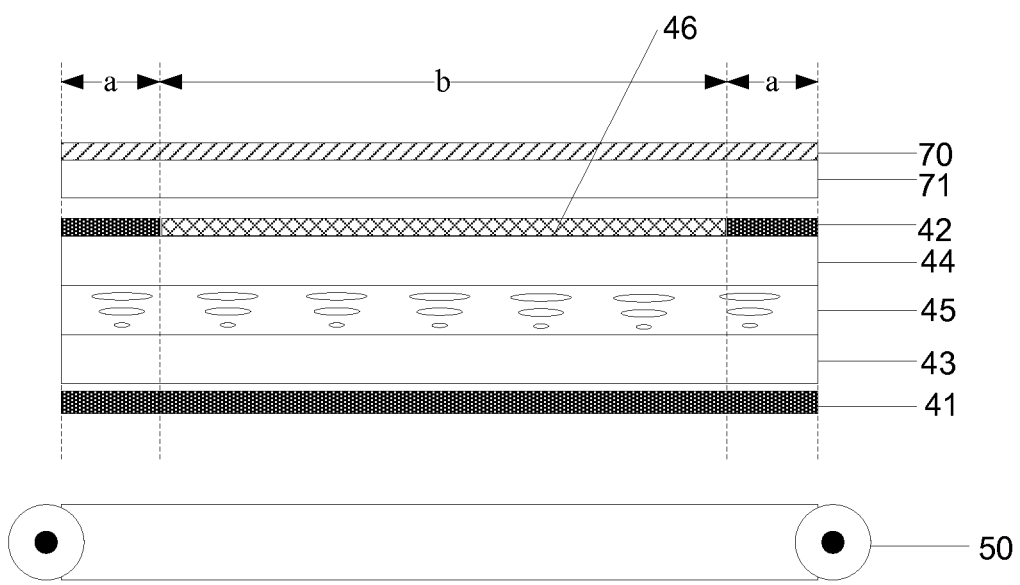
FIG. 5 is a schematic diagram showing the structure of the liquid crystal display panel included in an illumination device provided by a second embodiment of the present invention.

In the above illumination device provided by the first embodiment of the present invention, in practical, there is a possibility that light leakage is occurred in the dedicated glasses due to inappropriate viewing angle (for example, the user inclining his head, and so on), or light leakage is occurred upon observing due to the analyzer and the illumination device are not fixed at proper positions. In order to improve the display quality for displaying the secret information in the light emitting area b of the liquid crystal display panel when the same is viewed by wearing the dedicated glasses or through the analyzer, as shown in FIG. 1, the second embodiment of the present invention provides an illumination device including a support member 30 and a liquid crystal display panel 40 mounted on the support member 30. As shown in FIG. 2a to FIG. 2d, the liquid crystal display panel 40 includes a display area "a" and a light emitting area "b." As shown in FIG. 5, at its light incoming side, the liquid crystal display panel 40 in its areas corresponding to the display area a and the light emitting area b has a first polarization sheet 41, that is, at the side where there is a backlight module from which light is emitted, the first polarization sheet 41 is provided. At its light outgoing side, the liquid crystal display panel 40 only in an area corresponding to the display area "a" has a second polarization sheet 42, and an area corresponding to the light emitting area "b" has a quarter-wave plate 46. The fast axis of the quarter-wave plate 46 forms a predetermined angle with the polarization axis of the first polarization sheet 41, and the predetermined angle is larger than or equal to 0 degree and less than or equal to 90 degrees.

In the present embodiment, the illumination device is described by taking a wall lamp as an example. For example, in practice, as shown in FIG. 1, the liquid crystal display panel 40 can be fixed on a wall surface 20 perpendicular to the ground 10 by using the support member 30 included in the illumination device. Of course, the illumination device provided by the present embodiment may also be used as a ceiling lamp, or other illumination lamp, there is no limitation herein.

Hereinafter, the principle of the above illumination device provided by the second embodiment will be described.

The display area a in the illumination device provided by the second embodiment of the present invention may display normal images, for decorating the outer appearance of the illumination device. In practice, the content displayed by the display area a may be suitably designed according to user's requirements, for example, the content to be displayed may be in a stationary pattern, such as, strips, scenes, pictures, and so on, and may also be in a dynamic pattern, such as a flying dragon, a swimming golden fish, and so on. Furthermore, the shape of the display area a and the light emitting area b may be designed according to the requirements by the content to be displayed, for example, may be of various shapes as shown in FIG. 2a to FIG. 2d, and there is no limitation herein.

In order to describe the benefit effect of the light emitting area b of the illumination device, a dedicated glasses for the above illumination device provided by the second embodiment is introduced, and the dedicated glasses includes lenses each having a quarter-wave plate and a second polarization sheet arranged sequentially in a direction from the light incoming side thereof to the light outgoing side, the fast axis of the quarter-wave plate and the polarization axis of the second polarization sheet form an angle which is equal to the predetermined angle or the sum of the angle and the predetermined angle is 90 degrees. Or an analyzer for the above illumination device provided by the second embodiment of the present invention is introduced, the analyzer includes a quarter-waver plate and a second polarization sheet sequentially arranged in a direction from the light incoming side to the light outgoing side, and an angle formed between the fast axis of the quarter-wave plate and the polarization axis of the second polarization sheet is equal to the predetermined angle, or the sum of the angle and the predetermined angle is 90 degrees. For example, the dedicated glasses can be carried by the user, and the analyzer can be provided at a fixed position at a certain distance from the illumination device. The dedicated glasses or the analyzer will not be separately described below.

Figure 6A:
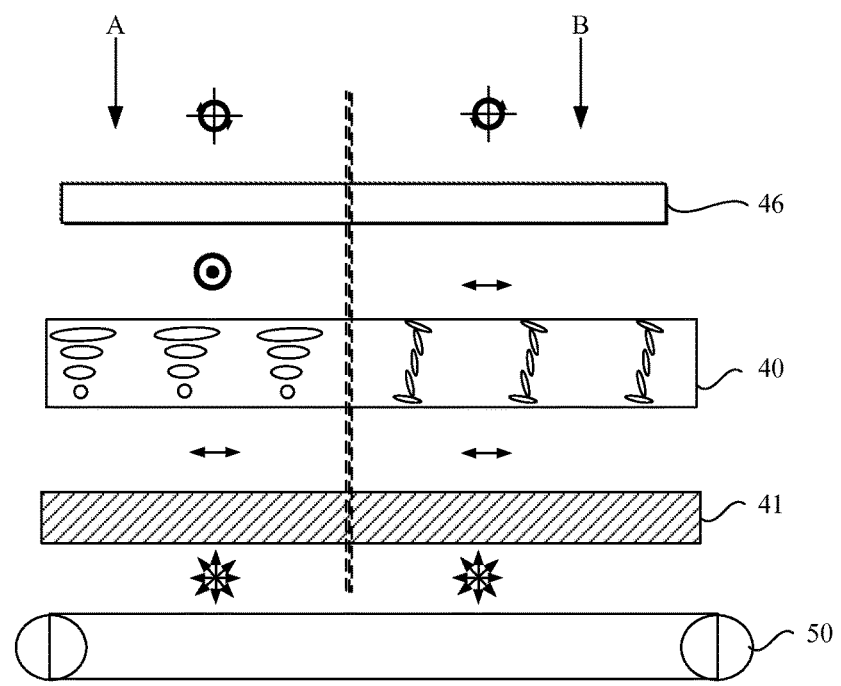
FIG. 6a and FIG. 6b are schematic diagrams showing the principle of the second embodiment of the present invention.

In the illumination device provided by the second embodiment of the present invention, as shown in FIG. 6a, the area A and the area B are respectively in a bright state and a dark state, the liquid crystal display panel 40 has only the first polarization sheet 41 in the light emitting area, and the light is converted into line polarized light after passing through the first polarization sheet 41, the line polarized light is transmitted through the liquid crystal display panel 40 and then incident on the quarter-wave plate. Since the quarter-wave plate 45 can convert the line polarized light, the polarization direction of which forms an angle of 45 degree with the fast axis or slow axis of the quarter-wave plate, into circular polarized light, and convert the line polarized light, the polarization direction of which forms an acute angle other than 45 degree with the fast axis or the slow axis of the quarter-wave plate, into elliptic polarized light, the information contained in the light emitting area of the liquid crystal display panel 40 after 45 degree angularly modulated by the quarter-wave plate 45 can not be observed in naked eye state, and the liquid crystal display panel 40 emits white light, and thus can be used as an illumination lamp.

Figure 6B:
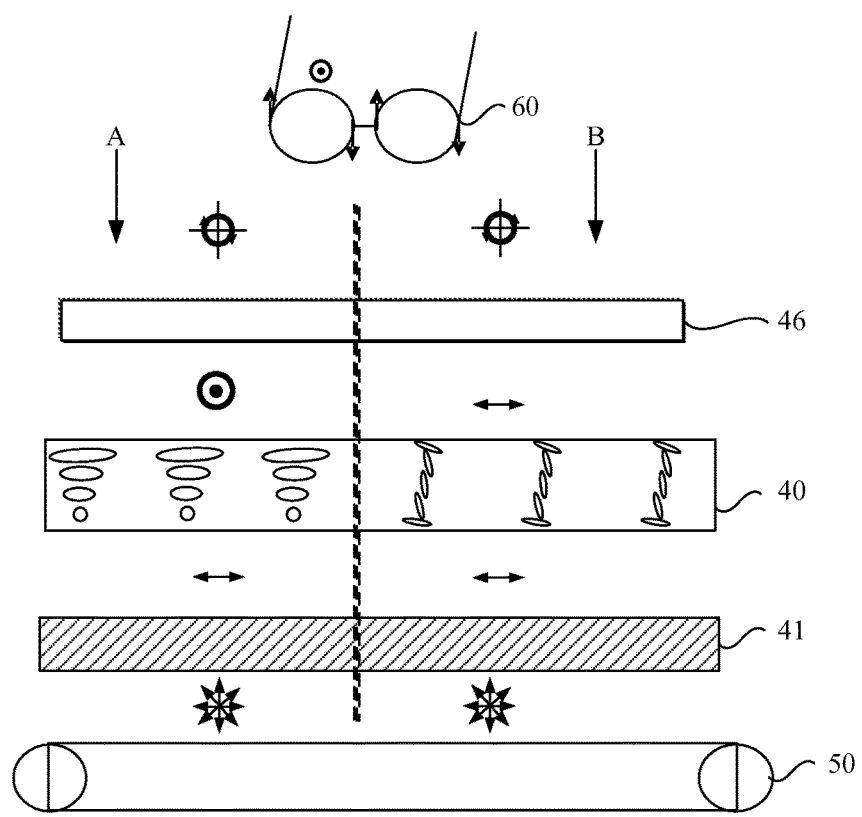

If the predetermined angle is 90 degrees or 0 degree, when the line polarized light that has been transmitted through the first polarization sheet 41 is transmitted through the liquid crystal display panel 40, its polarization direction is rotated by 90 degrees or 0 degree, forms an angle of 0 degree or 90 degrees with the fast axis of the quarter-wave plate 45, thus the light transmitted through the quarter-wave plate 45 is still line polarized light, at this time; as shown in FIG. 6b, the quarter-wave plate in the dedicated glasses 60 or in the analyzer (not shown in figures) has a fast axis forming an angle of 0 degree or 90 degrees with the polarization axis of the second polarization sheet, and when the polarization axis of the second polarization sheet is perpendicular to or parallel to the polarization axis of the first polarization sheet 41, the secret information displayed in the light emitting area b by the liquid crystal display panel 40 can be observed by means of the dedicated glasses 60 or the analyzer.

If the predetermined angle is 45 degrees, when the line polarized light that has been transmitted through the first polarization sheet 41 is transmitted through the liquid crystal display panel 40, its polarization direction is rotated by 90 degrees or 0 degree, forms a angle of 45 degree with the fast axis of the quarter-wave plate 45, thus the light transmitted through the quarter-wave plate 45 is circular polarized light; the quarter-wave plate in the dedicated glasses 60 or in the analyzer has a fast axis forming an angle of 45 degree with the polarization axis of the second polarization sheet, at this time, even when an angle formed between the polarization axis of the second polarization sheet in the dedicated glasses or in the analyzer and the polarization axis of the first polarization sheet 41 in the liquid crystal display panel is at an arbitrary value, the secret information displayed in the light emitting area b by the liquid crystal display panel 40 can be observed by means of the dedicated glasses 60 or the analyzer.

If the predetermined angle is other acute angle, when the line polarized light that has been transmitted through the first polarization sheet 41 is transmitted through the liquid crystal display panel 40, its polarization direction is rotated by 90 degrees or 0 degree, and forms an acute angle other than 45 degree with the fast axis of the quarter-wave plate 45, and therefore the light transmitted through the quarter-wave plate 45 becomes elliptic polarized light. At this time, if the fast axis of the quarter-wave plate in the dedicated glasses 60 or in the analyzer forms an angle, equal to the predetermined angle, with the polarization axis of the second polarization sheet, then, when the fast axes of both the quarter-wave plates are perpendicular to each other, the secret information displayed in the light emitting area b by the liquid crystal display panel 40 can be observed by means of the dedicated glasses or the analyzer; if the sum of the angle formed between the fast axis of the quarter-wave plate in the dedicated glasses 60 or in the analyzer and the second polarization sheet and the predetermined angle is 90 degrees, then, when the fast axes of both the quarter-wave plates are parallel to each other, the secret information displayed in the light emitting area b by the liquid crystal display panel can be observed by means of the dedicated glasses 60 or the analyzer.

Therefore, only if the illumination device is observed by means of the dedicated glasses 60 or the analyzer which is provided with the quarter-wave plate and the second polarization sheet, can the secret content displayed in the light emitting area b of the liquid crystal display panel 40 be observed. Furthermore, by providing the quarter-wave plates separately in the liquid crystal display panel 40 and the dedicated glasses 60 or the analyzer, the matching effect between the illumination device and the dedicated glasses or the analyzer can be improved, it is possible to prevent light leakage from occurring due to inappropriate viewing angle of the observer, and it is possible to improve the display quality for displaying the secret content in the light emitting area b of the liquid crystal display panel 40 when observed by means of the dedicated glasses 60 or the analyzer.

In practice, the above illumination device provided by the second embodiment of the present invention can be used in a meeting room or in an exhibition hall. For example, a row of the above illumination devices can be provided in the exhibition hall as wall lamps, for the ordinary visitors, the illumination device only acts to illuminate, but the staff may wear a pair of special dedicated glasses having the quarter-wave plate and the second polarization sheet, or the staff may use the stationary analyzer to observe the information, such as notice, client information, and so on from the illumination device.

Since the liquid crystal display panel 40 in the above illumination device is used as an illumination lamp, there is no strictly requirement on the color gamut of the panel. In one example, when the secret information to be displayed is not relevant to the color, that is, when the content to be displayed is only a piece of black-white picture information having a gray scale, the color filter layer in the liquid crystal display panel 40 can be omitted. Thus, the manufacturing process for the liquid crystal display panel 40 can be simplified on one hand, and on the other hand, the emitting brightness of the liquid crystal display panel 40 as an illumination lamp can be increased.

For example, as shown in FIG. 5, the liquid crystal display panel 40 may include an array substrate 43 and a counter substrate 44 provided opposite to each other, and a liquid crystal layer 45 provided between the counter substrate 44 and the array substrate 43. A black matrix layer and a color filter layer are provided at the side of the counter substrate 44 facing the array substrate 43 or at the side of the array substrate 43 facing the counter substrate 44. Alternatively, the color filter layer can be omitted, that is, only the black matrix layer is provided at the side of the counter substrate 44 facing the array substrate 43 or at the side of the array substrate 43 facing the counter substrate 44.

When not in operation, the illumination device provided by the embodiments of the present invention generally renders black color, but in order to improve the practicability and aesthetics of the illumination device, in one example, a transflective layer can be provided at the light outgoing side of the liquid crystal display panel 40 so that the illumination device can be used as a mirror by reflecting the ambient light when not in operation.

For example, provision of the transflective layer on the outgoing side of the liquid crystal display panel 40 can be realized by employing a metalized film or a dual-reflective brightness enhancement film (DEBEF).

For example, as shown in FIG. 5, the transflective layer 70 may be provided on a transparent substrate 71 at the side of the counter substrate 44 facing away the array substrate 43.

Based on the same inventive concept, the second embodiment of the present invention further provides an illumination system including the above illumination device as provided by the second embodiment of the present invention and the dedicated glasses for the illumination device; or the illumination system includes the above illumination device as provided by the second embodiment of the present invention and the analyzer for the illumination device, which is provided at a certain distance from the illumination device. The implementation of the illumination system may refer to the embodiment described with reference to the above illumination device and its dedicated glasses or analyzer, and will not be repeatedly described here.

In the above illumination device, the dedicated glasses thereof, the analyzer thereof and the illumination system provided by the second embodiment of the present invention, the liquid crystal display panel can be used as a lamp for displaying patterns and information, and the liquid crystal display panel comprises a display area and a light emitting area, at the light incoming side, the areas corresponding to the display area and the light emitting area are both provided with the first polarization sheet, and at the light outgoing side, only the area corresponding to the display area has the second polarization sheet, that is, the light emitting area is not provided with the second polarization sheet. In addition, the quarter-wave plate may be further provided at the area corresponding to the light emitting area at the light emitting side. Because the quarter-wave plate can convert the line polarized light, the polarization direction of which forms an angle of 45 degree with the fast axis or the slow axis thereof, into a circular polarized light, and convert the line polarized light, the polarization direction of which forms an acute angle other than 45 degree with the fast axis or the slow axis thereof, into the elliptic polarized light, in the light emitting area the information contained in the liquid crystal display panel after being modulated by the quarter-wave plate can not be observed in the naked eye state, so that the liquid crystal display panel emits white light and can be used as an illumination lamp. In the second embodiment of the present invention, only if the illumination device is observed through the dedicated glasses or the analyzer having the quarter-wave plate and the second polarization sheet, can the secret content displayed in the light emitting area by the liquid crystal display panel be seen. Moreover, by providing the quarter-wave plate respectively on the liquid crystal display panel and the dedicated glasses or the analyzer, the matching effect between the illumination device and the dedicated glasses or the analyzer can be improved, it is possible to prevent light leakage at the dedicated glasses or the analyzer from occurring due to inappropriate viewing angle of the observer, and it is possible to improve the display quality for observing the secret content displayed in the light emitting area by the liquid crystal display panel 40 by wearing the dedicated glasses 60 or through the analyzer.

Obviously, various modifications and variations can be made to the present invention by the person skilled in the art without departing from the spirit and scope of the present invention. Thus, it is intended that these modification and variation are also included in the present invention as long as these modification and variation falls within the scope of the following claims and its equivalents.

The present application claims the priority of Chinese Patent Application No. 201410277670.8 filed on Jun. 19, 2014, the Chinese Patent Application is entirely incorporated therein as a part of the present application by reference.

What is claimed is:

1. An illumination device including a support member and a liquid crystal display panel mounted on the support member, wherein:

the liquid crystal display panel comprises a display area and a light emitting area;

areas at a light incoming side of the liquid crystal display panel corresponding to the display area and the light emitting area are provided with a first polarization sheet; and an area at a light outgoing side of the liquid crystal display panel corresponding only to the display area is provided with a second polarization sheet.

2. The illumination device according to claim 1, wherein: the area at the light outgoing side of the liquid crystal display panel corresponding to the light emitting area is provided with a quarter-wave plate, a fast axis of the quarter-wave plate forms a predetermined angle with a polarization axis of the first polarization sheet, and the predetermined angle is larger than or equal to 0 degree, and is less than or equal to 90 degrees.

3. The illumination device according to claim 2, wherein the predetermined angle is 45 degrees.

4. The illumination device according to claim 2, wherein the liquid crystal display panel includes an array substrate and a counter substrate arranged opposite to each other, and a liquid crystal layer provided between the counter substrate and the array substrate; wherein:

a black matrix layer and a color filter layer are provided at a side of the counter substrate facing the array substrate or at a side of the array substrate facing the counter substrate; or only the black matrix layer is provided at the side of the counter substrate facing the array substrate or at the side of the array substrate facing the counter substrate.

5. The illumination device according to claim 4, further comprising a transflective layer provided on a transparent substrate at a side of the counter substrate facing away from the array substrate.

6. The illumination device according to claim 1, wherein the liquid crystal display panel includes an array substrate and a counter substrate arranged opposite to each other, and a liquid crystal layer provided between the counter substrate and the array substrate; wherein:

a black matrix layer and a color filter layer are provided at a side of the counter substrate facing the array substrate or at a side of the array substrate facing the counter substrate; or only the black matrix layer is provided at the side of the counter substrate facing the array substrate or at the side of the array substrate facing the counter substrate.

7. The illumination device according to claim 6, further comprising a transflective layer provided on a transparent substrate at a side of the counter substrate facing away from the array substrate.

8. The illumination device according to claim 6, further comprising a transflective layer provided on a transparent substrate at a side of the counter substrate facing away from the array substrate.

9. A dedicated glasses for the illumination device according to claim 1, comprising lenses each having a second polarization sheet.

10. The dedicated glasses according to claim 9, wherein, the lenses each further include a quarter-wave plate, and the quarter-wave plate and the second polarization sheet are arranged sequentially in a direction from a light incoming side of the lenses to a light outgoing side thereof; and a fast axis of the quarter-wave plate forms an angle, equal to a predetermined angle with a polarization axis of the second polarization sheet, or a sum of the angle formed between the fast axis of the quarter-wave plate and the polarization axis of the second polarization sheet and the predetermined angle is 90 degrees.

11. An analyzer for the illumination device according to claim 1, comprising a second polarization sheet.

12. The analyzer according to claim 11, further including a quarter-wave plate, wherein the quarter-wave plate and the second polarization sheet are arranged sequentially in a direction from the light incoming side to the light outgoing side, an angle formed between a fast axis of the quarter-wave plate and a polarization axis of the second polarization sheet is equal to a predetermined angle, or a sum of the angle formed between the fast axis of the quarter-wave plate and the polarization axis of the second polarization sheet and the predetermined angle is 90 degrees.

13. An illumination system comprising the illumination device according to claim 1, and further comprising a dedicated glasses comprising lenses each having a second polarization sheet or an analyzer.

14. The illumination system according to claim 13, wherein:

the liquid crystal display panel is provided with a quarter-wave plate at the light outgoing side in the area corresponding to the light emitting area, the dedicated glasses include the lenses each having a quarter-wave plate or the analyzer includes a quarter-wave plate.

15. The illumination system according to claim 14, wherein:

the quarter-wave plate and the second polarization sheet are arranged sequentially in a direction from the light incoming side to the light outgoing side, an angle formed between a fast axis of the quarter-wave plate and a polarization axis of the second polarization sheet is equal to a predetermined angle, or a sum of the angle formed between the fast axis of the quarter-wave plate and the polarization axis of the second polarization sheet and the predetermined angle is 90 degrees.

* * * * *